Dec. 24, 1957     P. G. FILMER     2,817,269
PHOTOGRAPHIC VIEWERS

Filed June 28, 1954                           3 Sheets-Sheet 1

INVENTOR
Philip G. Filmer
BY
C. F. Dille
ATTORNEY

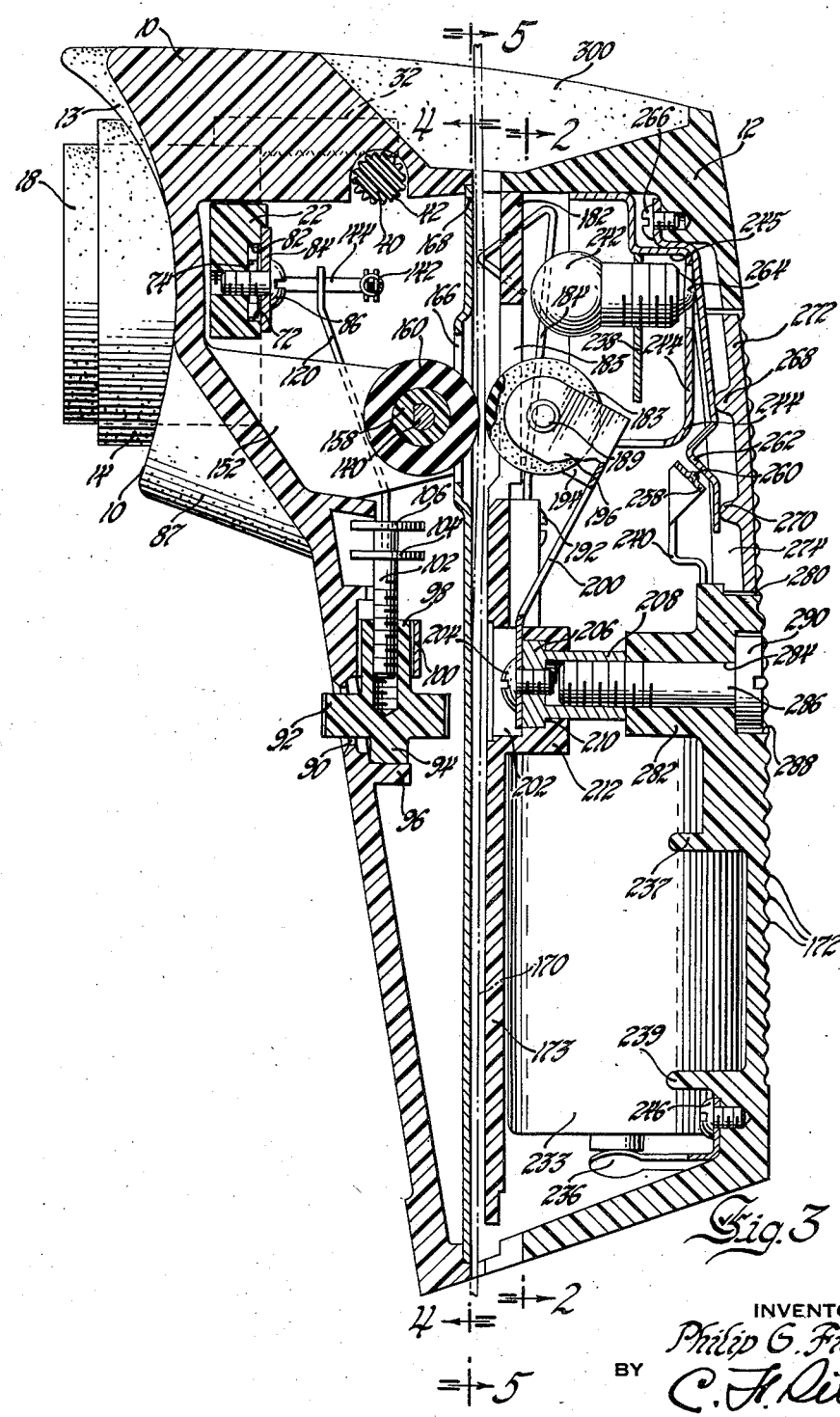

Dec. 24, 1957 P. G. FILMER 2,817,269
PHOTOGRAPHIC VIEWERS
Filed June 28, 1954 3 Sheets-Sheet 3
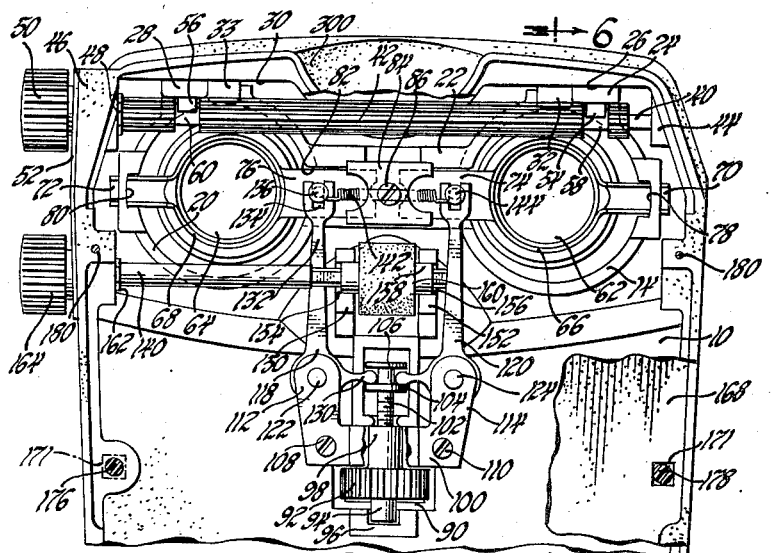
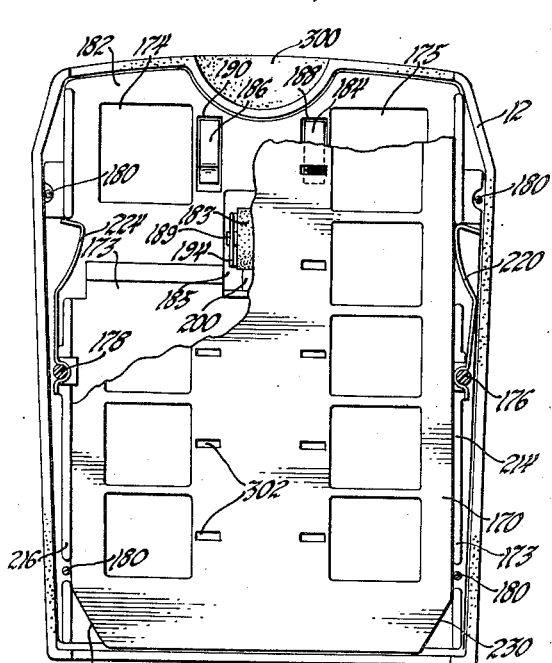
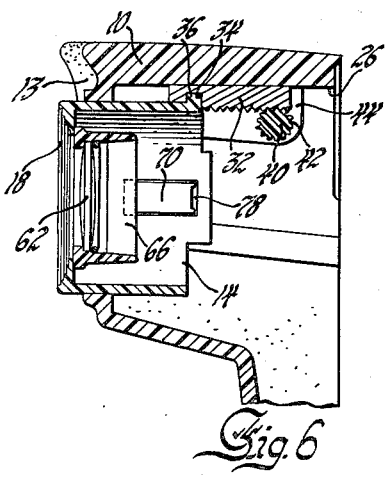
INVENTOR
Philip G. Filmer
BY
ATTORNEY

2,817,269

PHOTOGRAPHIC VIEWERS

Philip G. Filmer, Pleasant Ridge, Mich., assignor to General Motors Corporation, Detroit, Mich., a corporation of Delaware Application June 28, 1954, Serial No. 439,617

2 Claims. (Cl. 88—31)

This invention relates to photographic viewers and more particularly to viewers of the stereoscopic type in which pairs of images are illuminated.

An object of the present invention is to provide an improved viewer of simple construction which is convenient to use, compact in structure, and suitable for rugged service.

A feature of the present invention is a photographic viewer with a case made in two detachable portions defining a passage between them for a picture slide with one of the portions enclosing a light system and the other enclosing lenses and suitable adjusting devices, the device being convenient to operate because of its arrangement of parts.

Another feature is a viewer case of inverted L-shaped construction having light and adjustment controls so arranged thereon as to promote convenience in use.

These and other important features of the invention will now be described in detail in the specification and then pointed out more particularly in the appended claims.

In the drawings:

Fig. 3 is a sectional view taken approximately along the line 3—3 of Fig. 1 and drawn to an enlarged scale;

Fig. 4 is a sectional view of the upper half of the viewer taken along the line 4—4 of Fig. 3 and drawn to a reduced scale;

Fig. 5 is a view taken along the line 5—5 of Fig. 3 with a picture slide in place and partially broken away; and Fig. 6 is a sectional view taken along the line 6—6 of Fig. 4.

Figure 1:
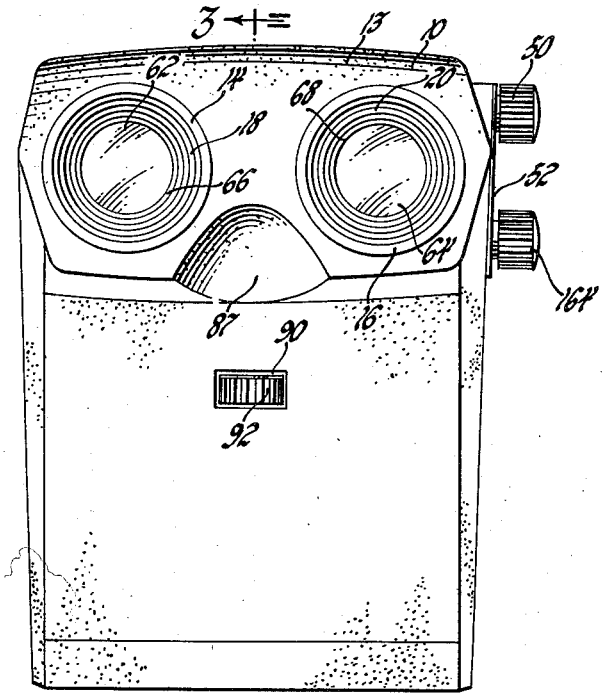
Fig. 1 is a front and elevational view of a viewer embodying the present invention.

The device embodying the present invention and illustrated in the drawings includes front and back portions 10 and 12, respectively, which constitute the main body of the viewer. These portions are detachably joined together as will be described hereinafter. Conveniently, these portions may be made of plastic.

The front portion 10 is of inverted L-shaped construction and is provided with a front curved surface 13 from which forwardly protrudes two bosses 14 and 16, the axes of which are spaced apart a pupillary distance suitable to cover the range of average individuals. The bosses 14 and 16 are telescopically fitted with two eyepieces 18 and 20, respectively. These eyepieces are preferably made integral with each other and are joined by means of a bridge section 22 as shown more particularly in Figs. 3 and 4. Integral with the eyepiece 18 is formed a horizontal lug 24, the upper surface of which is adapted to slide against the under surface 26 of the top to the case portion 10. A similar lug 28 is made integral with the eyepiece 20 and is adapted to slide on the downwardly facing surface 30 of the case.

Adjacent to the lug 24 is placed a rack 32 which is adapted to slide on the surface 26 and this rack is notched as at 34 (Fig. 6) to receive a lip 36 formed on the upper side of the eyepiece 18. A similar rack 33 is provided for the eyepiece 20. A shaft 40 is provided having gear teeth 42 along its length thereby forming a pinion gear arranged to engage the teeth of the two racks 32 and 33. The shaft is journaled in sides of the case portion 10 at 44 and 46. The shaft 40 is held against axial movement in the case by means of a snap washer 48 and a knurled knob 50 fixed to the end of the shaft outside of the case. A plate 52 is arranged on the outside of the case portion 10 and is interposed between the knob 50 and the plastic case body. Spring clips 54 and 56 are interposed between the lugs 24 and 28, respectively, and groove portions 58 and 60 formed in the shaft 40. These springs prevent too free rotation of the shaft 40 as will later appear. These springs also hold the lugs 24 and 28 firmly against surfaces 26 and 30. Lenses 62 and 64 are held in lens mountings 66 and 68, respectively. These mountings are arranged to slide transversely with respect to the eyepieces and are guided in such transverse motion by L-shaped side tongues 70 and 72 extending outwardly and two L-shaped inner tongues 74 and 76 extending inwardly. The tongue 70 is arranged to slide through an opening 78 formed in the eyepiece 18 and the tongue 72 is adapted to move similarly through an opening 80 formed in the eyepiece 20. The inwardly directed ends of tongues 74 and 76 do not abut, but are spaced from each other, as best seen in Fig. 4, and are held within a groove 82 formed in the bridge 22 by means of a retainer plate 84 and screw 86.

From the above description, it may be seen that the front portion 10 of the casing is substantially hollow and that the eyepieces 18 and 20 may move inwardly and outwardly as a unit and with respect to the casing with the lugs 24 and 28 supporting and guiding the lenses so that the motion of the lenses may be parallel to the surfaces 26 and 30 of the casing. At the same time, the lens mountings 66 and 68 may be moved transversely with respect to the casing and to the axes of the lenses and toward or away from each other. A recess 87 is provided in the case to accommodate the user's nose and permit him to hold the eyepiece up close.

Midway the height of the front portion 10 is formed a wall opening 90 through which extends a knurled interocular adjustment wheel 92, the hub 94 of which rests upon a shelf-like protuberance 96 made integral with the portion 10. The wheel 92 is also provided with an upwardly extending and internally threaded hub portion 98 which is retained in position on the case by means of a U-shaped bracket 100. A threaded pin 102 is threaded into the hub 98 and bears two rectangular spaced and parallel plates 104 and 106. The bracket 100 is attached to rearwardly extending lugs (not shown) formed integral with the front portion 10 by means of two screws 108 and 110 and is provided with two upstanding legs 112 and 114 which serve to retain two bell cranks 118 and 120 on two inwardly extending shafts 122 and 124, respectively. These shafts conveniently may be made integral with the plastic front case portion 10.

The bell cranks 118 and 120 are similar except for being to the opposite hand and are similarly connected to the lenses by pin and slot arrangements. Specific description of these cranks is, therefore, confined to crank 118 which is provided with a horizontal leg 130 the free end of which is rounded to act as a cam between the two plates 104 and 106 and also with a vertical leg 132 which is slotted at 134 to engage a pin 136 fixed to the tongue 76. The arm 132 is bent forwardly to avoid a horizontal shaft 140 and the pin 136 is of sufficient length so that the pin and lens mounting 68 may move forwardly and backwardly a suitable distance for focusing. A coil spring 142 joins the rearwardly extending end of the pin 136 to the corresponding end of a similar pin 144 joined to the tongue 74.

Two projections 150 and 152 (Fig. 4) are spaced from each other and directed inwardly as integral parts of the case portion 10 and they are notched as at 154 and 156 rotatively to receive the ends of a hub 158 of a resilient rubber roller 160 which is mounted to rotate with the shaft 140. A spring washer 162 is retained within a groove (not shown) on the shaft 140 and co-operates with an outside knurled knob 164 in holding the shaft 140 in place. As seen in Fig. 3, the rubber roller 160 is so placed that an arcuate portion thereof extends through an opening 166 in a rear wall 168 of the portion 10. Conveniently, this wall 168 may be made of metal and, in addition to the central opening 166, is provided with two rectangular openings (not shown) for registry with two pictures of a picture slide 170 (Fig. 5) and two openings 171 for alignment with two side pins 176 and 178 to be described.

The back portion 12 of the case is provided with a rear surface which is transversely serrated as at 172 to facilitate ease of handling and operating and this portion is also provided with a forward wall 173 which conveniently may be formed of plastic. This wall is provided with two openings 174 and 175 (Fig. 5) to register with the corresponding openings in the metal plate or wall 168. Integral with the wall 173 are the two side pins 176 and 178 above mentioned which are adapted to extend through the plate 168 into suitable recesses formed in the side walls of the case portion 10. These pins 176 and 178 serve to orient the parts as a preliminary to joining them together into a unit by suitable fastenings such as four screws 180 which pass through walls 173 and 168 and into case portion 10.

The upper portion 182 of the wall 173 is offset slightly to give a larger field of action to a picture slide indexing means comprising two springs 184 and 186, V-shaped loops of which extend forwardly through openings 188 and 190, respectively, in the wall 173. Ends of these indexing means are held to the wall 173 by means of screws, such as screw 192 partially shown in Fig. 3. The wall portion 182 is also provided with an opening 185 through which the arcuate surface of a resilient rubber roll 183 is adapted to extend for engagement with the picture slide 170 with the roll 160 cooperating as a backing member. The roll 183 is fixed to a tubular shaft 189 which is journaled in two ears 194 and 196 which are integral and at right angles with a spring member 200. The lower end of the spring arm or member 200 extends into a recess 202 of the wall 173 and is held in place by means of a screw 204 which passes through the arm 200 into the head 206 of an internally threaded brass member 208. The latter passes through the wall 173 and its shoulder 210 contacts an inner shoulder of a rearwardly protruding portion 212 formed integral with the wall 173.

The walls 168 and 173 are arranged parallel with each other and, because of side ridges 214 and 216 made integral with the wall 173, define between them a vertical passage for the reception and movement of the picture slide 170. The pins 176 and 178 serve a second purpose in that they aid to lock in place two spring members 220 and 224 curved portions of which are arranged to extend into the passage for engaging the edges of the picture slide 170. These springs, during asembly of the viewer, are held in position by flexed engagement with the pins 176 and 178 and the ridges 214 and 216 of the wall 173. It will be noted that the card or picture slide 170 is provided with slanted bottom edges 230 and 232 for proper engagement with the spring members 220 and 224.

Figure 2:
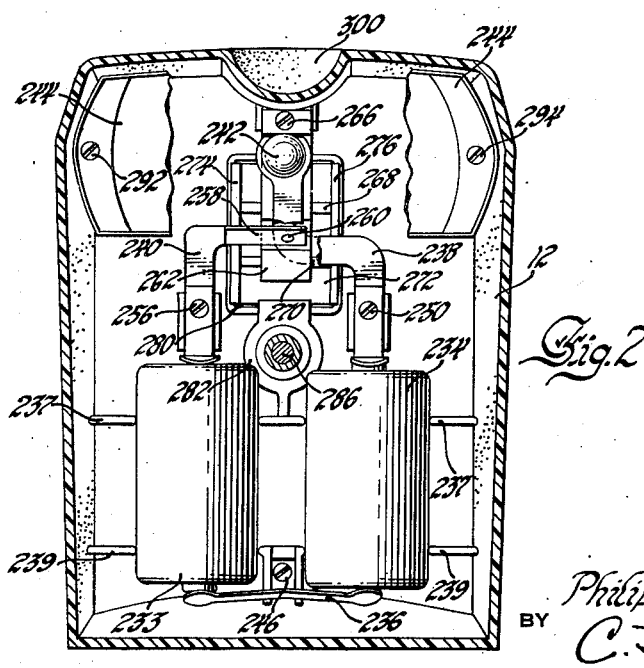
Fig. 2 is a sectional view drawn to a reduced scale and taken along the line 2—2 of Fig. 3.

The back portion 12 of the case is provided with a light system which includes two batteries 233 and 234 retained in their positions by spring terminals 236, 238 and 240 as well as by flanges 237 and 239 made integral with the portion 12. The latter also contains a light bulb 242 and a reflector 244. The spring terminal 236 engages the positive and negative poles of the two batteries and is held in position by means of a screw 246, which is threaded into the plastic body of the portion 12. The spring terminal 238 is held in position by means of a screw 250. One end of the terminal 238 resiliently engages the positive terminal of battery 234 and the other end is threaded to receive the bulb 242 within the reflector 244 and abuts a shoulder 245 on the latter. The terminal 240 has one end resiliently engaging the negative terminal of the battery 233 and it is held in place by means of a screw 256. The other end 258 of the terminal 240 extends horizontally and bears a knob 260 and this knob is normally spaced from a spring member 262 which is in contact with the bulb 242 at 264 and which is fastened to the back portion 12 by means of a screw 266. The spring member 262 is held tightly in bulb contact position by means of projections 268 and 270 formed on the inner wall of a switch plate 272. The exposed surface of the latter is arranged in position substantially flush with the rear surface of the case portion 12. The switch plate 272 bears two vertical flanges 274 and 276 (Fig. 2) which overlap margins of an opening 280 made in the portion 12 for receiving the switch plate 272. The central portion of the back portion 12 is provided with an inwardly directed boss 282 which is bored as at 284 for the reception of a screw 286. A recess 288 is formed in the rear of the case portion 12 to receive a head 290 of the screw 286. The arrangement of these parts is such that the screw 286 holds the case portion 12 in assembly with the case portion 10 and the boss 282 is held in abutting relation with the end of the brass member 208.

The reflector 244, which is of white plastic, is held in position by means of two screws 292 and 294 and is so shaped as to deflect light from the bulb 242 to whatever pair of pictures are brought into registry with the aligned rectangular openings of the wall 168 and the wall 173. A recess 300 is formed in the top of the case and is partially on each side of the slide receiving aperture to facilitate grasping of the slide by the fingers.

In the operation of the above-described device, it will be understood that a card or picture slide 170 may be inserted in the aperture transversely formed in the top of the viewer casing and pushed downwardly into engagement with the cooperating rubber rolls 160 and 183 and the side springs 220 and 224. The indexing springs 184 and 186 will extend into perforations 302 formed in the picture slide properly to aid in positioning of two of the pictures for view through the lenses. Rotation of the knob 164 will rotate the roller 160 for suitable advance or lowering of the picture slide through the top aperture of the case and along the passage defined by the plates 168 and 173. Rotation of the knob 50, through use of the rack and gearing arrangement, may be used to focus the lenses. Rotation of the wheel 92 will cause raising or lowering of the threaded pin 102 and consequent lateral outward or inward motion of the lens mountings to secure proper interocular adjustment. Close tolerances and the spring 142 serve to maintain the interocular adjustment parts in such relation that there is no appreciable lost motion in making an adjustment.

When viewing the pictures through the lenses, the depending portion of the case with matching contours at the parting plane constitutes a convenient means for holding the device and the location of the switch plate 272 is convenient for operation by either the second or third finger of either hand. Contact of the knob 260 with the spring member 262 by pressing the switch plate 272 and member 262 inwardly sets up a circuit from the batteries to illuminate the bulb 242. As a result, the unmasked pictures on the slide 170 are brilliantly illuminated for clear observance through the lenses.

The springs 220 and 224 have their upper ends extended outwardly to form upwardly presented shoulders as seen in Fig. 5. These shoulders are so placed that they constitute stops for a single picture slide if such a slide is to be used. With the bottom edge of a single picture slide resting on the shoulders referred to, the picture is properly located for viewing without the use of an indexing device.

I claim:

1. A photographic viewer comprising an inverted L-shaped case having front and back portions detachably joined with matching contours and a transverse slot in the top for reception of a dual picture slide, the said front portion having lenses spaced a pupillary distance apart to register with two pictures on said slide and a wall arranged to mask the remainder of said slide, a first manually operable means mounted in said case adapted interocularly to adjust said lenses, a second manually operable means confined to said front portion for focusing said lenses, a pin and slot arrangement connecting said first and second means to said lenses, said masking wall and a wall part of said back portion being arranged to define a passage extending downwardly-through the said case and in communication with said slot for guidance of said slide, manually operable means for feeding said slide along said passage including a resilient roller extending into said passage, the said back portion being a depending part of said casing of such thickness as to afford a hand hold and enclosing a light system and switch, and a switch plate yieldingly mounted with an exposed surface substantially flush with the outside of said back portion and arranged to operate said switch when said hand hold is exercised.

2. A photographic viewer comprising a case having an inverted L-shaped front portion and a back portion detachably joined to define a vertical passage between them for reception of a dual picture slide, the said front portion having lenses mounted in eyepieces and spaced a pupillary distance apart with their axes normal to said passage, means confined to said front portion for focusing said lenses and comprising a rack and pinion arrangement, means also confined to said front portion for interocularly adjusting said lenses and including bell cranks having pin and slot connections with said lenses, wall parts of said front and back portions defining said vertical passage having openings to register with two pictures on said slide, manually operable means for feeding said slide along said passage including opposed resilient rollers extending into said passage, the said back portion enclosing a light system and switch, and a switch plate yieldingly mounted with an exposed surface substantially flush with the rear surface of said back portion and arranged to operate said switch.

References Cited in the file of this patent

UNITED STATES PATENTS

| | | |
|---|---|---|
| 1,221,091 | Richard | Apr. 3, 1924 |
| 1,498,435 | Bouin | June 17, 1924 |
| 1,510,470 | Dunlaney et al. | Oct. 7, 1924 |
| 1,736,071 | Cressler | Nov. 19, 1929 |
| 2,336,288 | Peterson | Dec. 7, 1943 |
| 2,349,013 | Sparling | May 16, 1944 |
| 2,484,591 | Rochwite | Oct. 11, 1949 |
| 2,511,334 | Gruber | June 13, 1950 |
| 2,604,814 | Smith | July 29, 1952 |
| 2,666,359 | Collins | Jan. 19, 1954 |
| 2,674,920 | Bennett | Apr. 13, 1954 |
| 2,712,773 | Merrick | July 12, 1955 |

OTHER REFERENCES

| | | |
|---|---|---|
| 675,940 | France | Nov. 18, 1929 |
| 461,795 | Italy | Feb. 14, 1951 |
| 651,333 | Great Britain | Mar. 14, 1951 |